US008967886B2

(12) United States Patent
Kuo

(10) Patent No.: US 8,967,886 B2
(45) Date of Patent: Mar. 3, 2015

(54) OPTICAL CONNECTOR WITH PRINTED CIRCUIT BOARD AND LENS ELEMENT BONDED TO EACH OTHER

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/968,395

(22) Filed: Aug. 15, 2013

(65) Prior Publication Data

US 2014/0199034 A1  Jul. 17, 2014

(30) Foreign Application Priority Data

Jan. 14, 2013 (TW) .............. 102101289 A

(51) Int. Cl.
*G02B 6/36* (2006.01)
(52) U.S. Cl.
CPC ....................... *G02B 6/36* (2013.01)
USPC ............................ 385/93; 385/88

(58) Field of Classification Search
CPC ............ G02B 6/4204; G02B 6/4224; G02B 13/0015; G02B 6/32; G02B 6/36
USPC ........................................ 385/88–94
See application file for complete search history.

(56) References Cited

U.S. PATENT DOCUMENTS

| 6,722,793 | B2 * | 4/2004 | Althaus et al. | 385/92 |
| 6,870,990 | B2 * | 3/2005 | Uekawa | 385/49 |
| 7,108,432 | B2 * | 9/2006 | Nagasaka | 385/89 |
| 7,539,367 | B2 * | 5/2009 | Tamura et al. | 385/14 |
| 7,630,593 | B2 * | 12/2009 | Furuno et al. | 385/14 |
| 7,918,610 | B2 * | 4/2011 | Fujiwara et al. | 385/88 |
| 8,277,129 | B2 * | 10/2012 | Sabano et al. | 385/83 |
| 8,469,610 | B2 * | 6/2013 | Shao et al. | 385/93 |
| 2013/0094026 | A1 * | 4/2013 | Kuznia et al. | 356/445 |

* cited by examiner

*Primary Examiner* — Ellen Kim
(74) *Attorney, Agent, or Firm* — Novak Druce Connolly Bove + Quigg LLP

(57) ABSTRACT

An optical connector includes a substrate and a lens element. The lens element includes a first bottom surface contacting with the substrate, and the lens element defines a groove in the bottom surface.

13 Claims, 4 Drawing Sheets

OPTICAL CONNECTOR WITH PRINTED CIRCUIT BOARD AND LENS ELEMENT BONDED TO EACH OTHER

BACKGROUND

1. Technical Field

The present disclosure relates to optical connectors and, particularly, to an optical connector including a printed circuit board and a lens element bonded to the printed circuit board.

2. Description of Related Art

Optical connectors include a printed circuit board, a photoelectric element positioned on and electrically connected to the printed circuit board, and a lens element positioned on and fixed to the printed circuit board using adhesive. The lens element includes a lens and covers the photoelectric element such that the lens is aligned with the photoelectric element to increase light usage efficiency. However, the lens element needs to engage with other elements after being fixed to the printed circuit board, which may impact the lens element and cause position shift. Thus, the alignment and quality of the optical connector is degraded.

Therefore, it is desirable to provide an optical connector that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
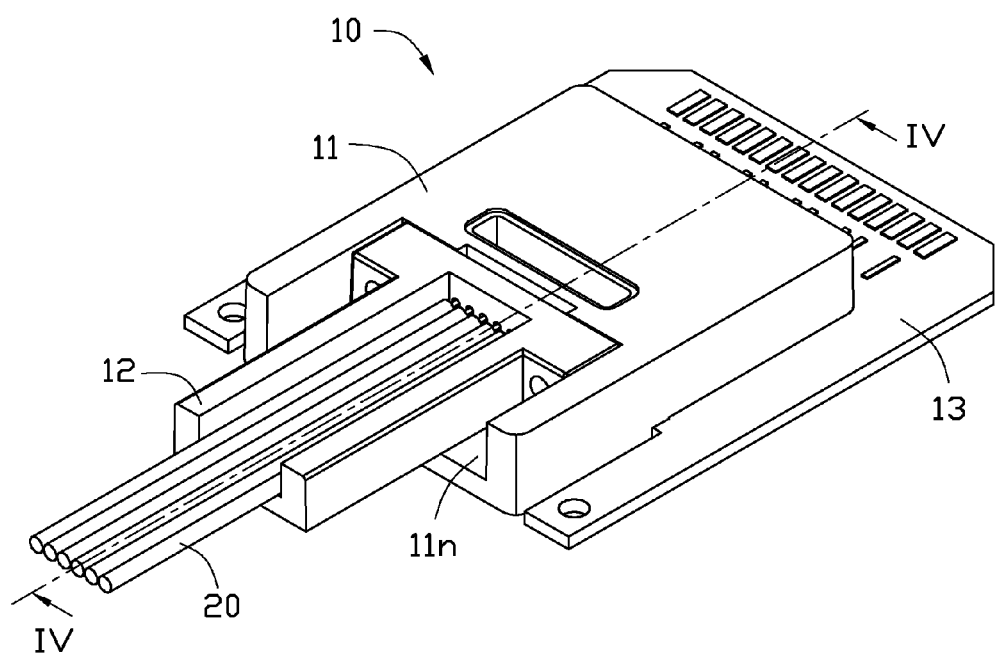
FIG. 1 is an isometric view of an optical connector for coupling with a number of optical fibers, according to an embodiment.

FIG. 1 shows an optical connector 10 of the embodiment. The optical connector 10 is used for coupling with a number of optical fibers 20. The optical connector 10 includes a lens element 11, a jumper 12, and a photoelectric module 13.

Figure 2:
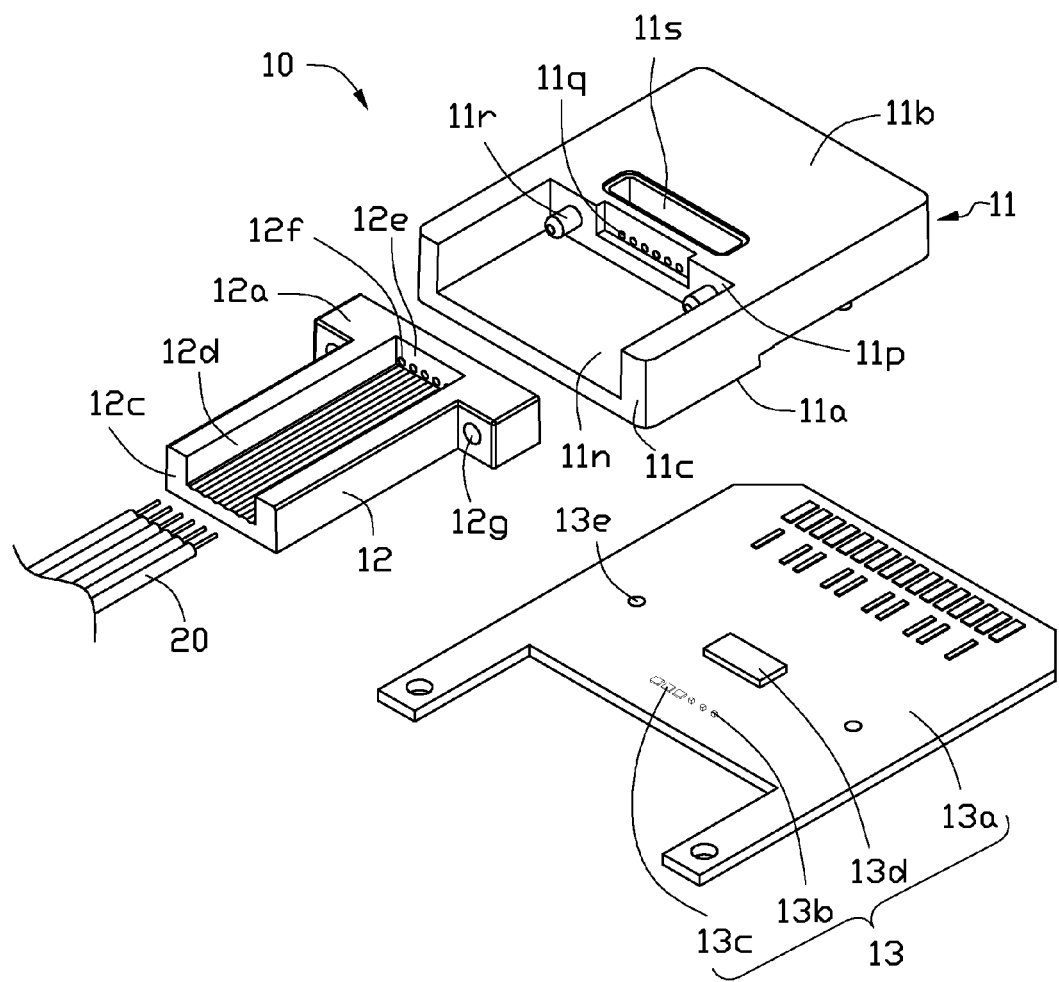
FIG. 2 is an exploded view of the optical connector and the optical fibers of FIG. 1.
Figure 3:
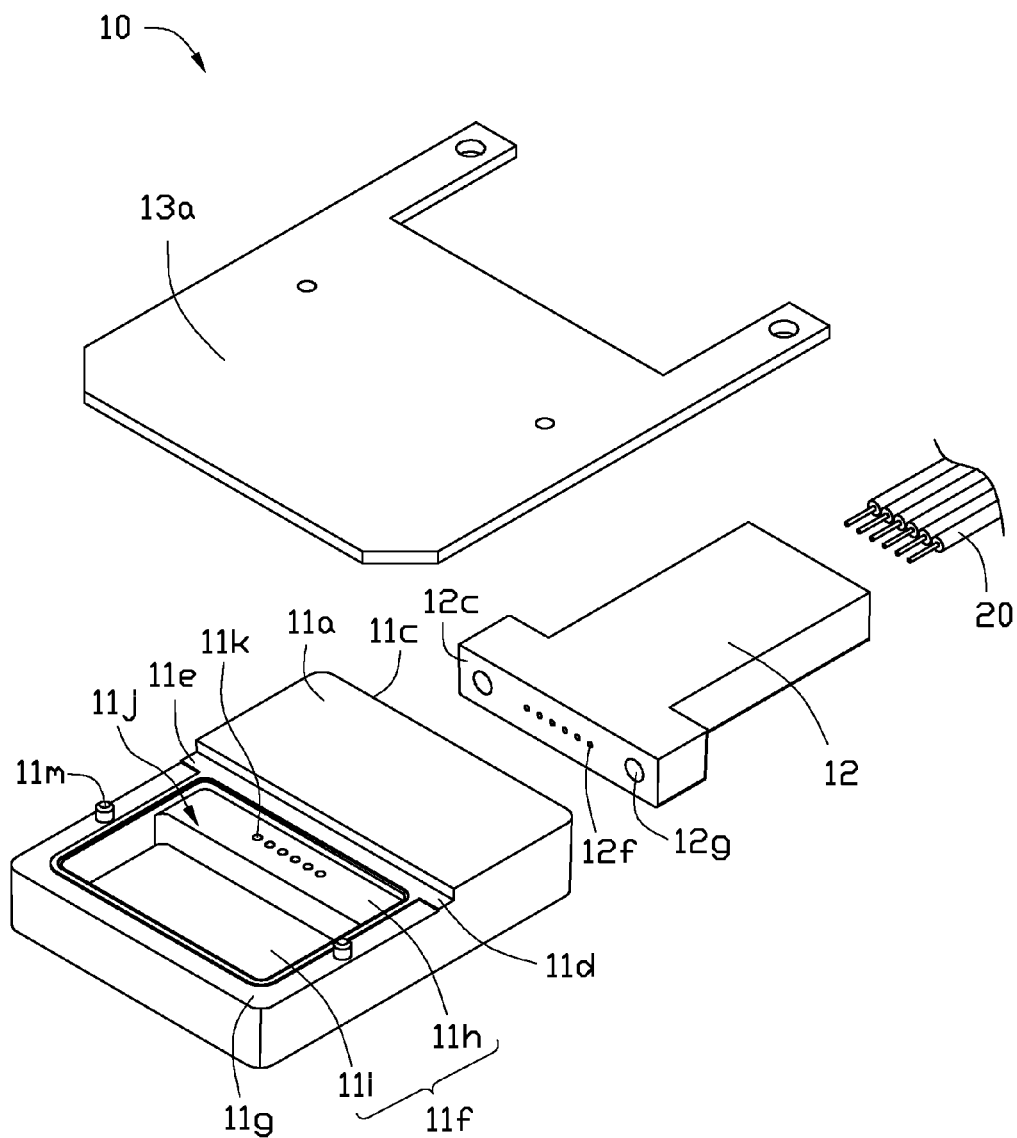
FIG. 3 is similar to FIG. 2, but is viewed from another angle.
Figure 4:
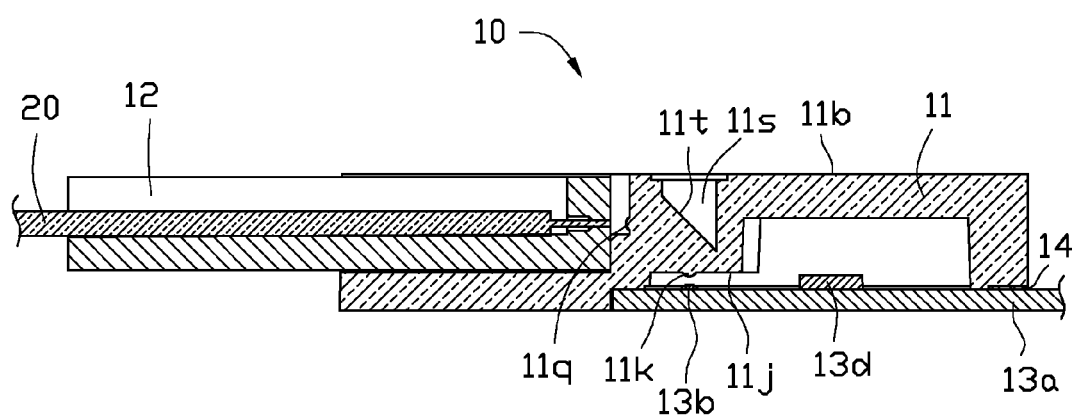
FIG. 4 is a cross-sectional view taken along a line IV-IV of FIG. 1.

FIGS. 2-4 show that the lens element 11 is substantially rectangular and includes a lower surface 11a, an upper surface 11b opposite to the lower surface 11a, and a front surface 11c perpendicularly connected to the lower surface 11a and the upper surface 11b.

The lens element 11 defines a substantially rectangular cutout 11d in the lower surface 11a. The cutout 11d is positioned far from the front surface 11c and extends through three sides of the lower surface 11a. The cutout 11d has a first bottom surface 11e.

The lens element 11 also defines a receiving recess 11f and a groove 11g in the first bottom surface 11e. The receiving recess 11f is positioned at a central portion of the bottom surface and has a first portion 11h and a second portion 11i, both of which are substantially rectangular. The first portion 11h is positioned adjacent to the front surface 11c while the second portion 11i is positioned away from the front surface 11c. The second portion 11i is greater than the first portion 11h in width and depth. The first portion 11h has a second bottom surface 11j. The groove 11g is positioned at an outer periphery of the first bottom surface 11e that is away from the front surface. The groove 11g extends through three sides of the first bottom surface 11e.

The lens element 11 includes a number of internal lenses 11k formed on the second bottom surface 11j and equidistantly arranged along a line that is substantially parallel with the front surface 11c.

The lens element 11 also includes a first positioning structure 11m formed on the first bottom surface 11e. In this embodiment, the first positioning structure 11m includes two positioning pins extending up from the first bottoms surface 11e.

The lens element 11 also defines a substantially rectangular positioning space 11n in an intersecting portion of the upper surface 11b and the front surface 11c. The positioning space 11n has a sidewall 11p that is substantially parallel with the front surface 11c.

The lens element 11 also includes a number of external lenses 11q formed in the sidewall 11p equidistantly arranged along a line that is substantially parallel with the upper surface 11b.

The lens element 11 also includes a first locating structure 11r formed on the sidewall 11p. In this embodiment, the first locating structure 11r includes two locating pins extending up from the sidewall 11p.

The lens element 11 also defines a slot 11s in the upper surface 11b. A lengthwise direction of the slot 11s is substantially parallel with the front surface 11c. The slot 11s has a reflective surface 11t positioned adjacent to the sidewall 11p and slant relative to the sidewall 11p about 45 degrees. Each of the external lenses 11q is optical aligned with one of the internal lenses 11k via the reflective surface 11t.

The jumper 12 is substantially rectangular and includes a first surface 12a, a second surface 12b perpendicularly connected with the first surface 12a, and a third surface 12c perpendicularly connected with the first surface 12a and opposite to the second surface 12b.

The jumper 12 defines a fixing space 12d in an intersecting portion of the first surface 12a and the second surface 12b. The fixing space 12d is substantially rectangular and has a side surface 12e that is substantially parallel with the second surface 12b.

The jumper 12 defines a number of through holes 12f in the side surface 12e and extending through the second surface 12b. The through holes 12f are equidistantly arranged along a line that is substantially parallel with the first surface 12a.

The jumper 12 also includes a second locating structure 12g on the third surface 12c. The second locating structure 12g corresponds to the first locating structure 11r. In this embodiment, the second locating structure 12g includes two locating holes formed in the third surface 12c.

The photoelectric element 13 includes a substrate 13a, a number of light emitters 13b, a number of light receivers 13c, and a driving circuit 13d.

The substrate 13a, such as a printed circuit board, includes a second positioning structure 13e. The second positioning structure 13e corresponds to the first positioning structure 11m. In this embodiment, the second positioning structure 13e includes two positioning holes 13e formed in the substrate 13a. The positioning holes can be a through hole or a blind hole.

The light emitters 13b, such as light emitting diodes and laser diodes, and the light receivers 13c, such as photo diodes, are all positioned on the substrate 13a and linearly arranged and correspond to the internal lenses 11k. The driving circuit 13d is also positioned on the substrate 13a and configured for driving the light emitters 13b to emit light and the light receiver 13c to receive light.

In assembly, the lens element 11 is positioned on the substrate 13a by engaging the first positioning structure 11m with the second positioning structure 13e. The light emitters 13b and the light receivers 13c are received in the first portion 11h and the driving circuit 13d is received in the second portion 11i. Each of the light emitters 13b and the light receivers 13c is aligned with one of the internal lenses 11k. Then, the lens element 11 is fixed to the substrate 11a using adhesive 14. By employing the groove 11g, a contact surface between the lens element 11 and the adhesive 14 is increased. Thus, bonding force between the lens element 11 and the substrate 13a is increased. Alignment and quality of the optical connector 10 is improved.

Next, the jumper 12 is engaged with the positioning space 11n and is located by locating the first locating structure 11r with the second locating structure 12g. Each through hole 12f is aligned with one of the external lenses 11q. The optical fibers 20 are received in the fixing space 12d. Each optical fiber 20 is inserted into one of the through holes 12f and optically coupled with one of the light emitters 13b and light receivers 13b through one of the external lenses 11q, the reflective surface 11t, and one of the internal lenses 11k.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. An optical connector, comprising:
   a substrate; and
   a lens element comprising a first bottom surface contacting with the substrate, an upper surface opposite to the first bottom surface, and a front surface perpendicular to the first bottom surface and the upper surface, the lens element defining a receiving recess in the bottom surface, and a positioning space in an intersecting portion of the upper surface and the front surface, the receiving recess comprising a second bottom surface, the lens element comprising a plurality of transparent internal lenses formed on the second bottom surface, the positioning space having a sidewall that is substantially parallel with the front surface, the lens element comprising a plurality of transparent external lenses formed in the sidewall, the lens element defining a slot in the upper surface, the slot having a reflective surface positioned adjacent to the sidewall and slanting in relation to the sidewall, and each of the transparent external lens optical aligned with one of the transparent internal lenses via the reflective surface.

2. The optical connector of claim 1, wherein the lens element is substantially rectangular and further comprises a lower surface, the front surface is perpendicularly connected to the lower surface and the upper surface, the lens element defines a substantially rectangular cutout in the lower surface, the cutout is positioned far from the front surface and extends through three sides of the lower surface, and the cutout has the first bottom surface.

3. The optical connector of claim 2, wherein the lens element defines a groove in the bottom surface, the groove is positioned at an outer periphery of the first bottom surface that is away from the front surface, and the groove extends through three sides of the first bottom surface.

4. The optical connector of claim 2, wherein the lens element comprises a first positioning structure formed on the first bottom surface, the substrate comprises a second positioning structure, and the lens element is positioned on the substrate by engagement between the first positioning structure and the second positioning structure.

5. The optical connector of claim 4, wherein the first positioning structure comprises two positioning pins extending up from the first bottoms surface, the second positioning structure defines two positioning holes in the substrate, and the two positioning pins insert into the two positioning holes to secure the lens element on the substrate.

6. The optical connector of claim 2, wherein the receiving recess is positioned at a central portion of the bottom surface and has a first portion and a second portion, both of which are substantially rectangular, the first portion is positioned adjacent to the front surface while the second portion is positioned away from the front surface, the second portion is greater than the first portion in width and depth, the first portion has the second bottom surface.

7. The optical connector of claim 6, wherein the internal lenses are equidistantly arranged along a line that is substantially parallel with the front surface.

8. The optical connector of claim 7, wherein the positioning space is substantially rectangular.

9. The optical connector of claim 8, wherein the transparent external lenses are equidistantly arranged along a line that is substantially parallel with the upper surface, a lengthwise direction of the slot is substantially parallel with the front surface, the reflective surface slants in relation to the sidewall about 45 degrees.

10. An optical connector comprising:
    a substrate; and
    a lens element comprising a first bottom surface contacting with the substrate, an upper surface opposite to the first bottom surface, and a front surface perpendicular to the first bottom surface and the upper surface, the lens element defining a receiving recess in the bottom surface, and a positioning space in an intersecting portion of the upper surface and the front surface, the receiving recess comprising a second bottom surface, the lens element comprising a plurality of transparent internal lenses formed on the second bottom surface, the positioning space having a sidewall that is substantially parallel with the front surface, the lens element comprising a plurality of transparent external lenses formed in the sidewall, the lens element defining a slot in the upper surface, the slot having a reflective surface positioned adjacent to the sidewall and slanting in relation to the sidewall, and each of the transparent external lens optical aligned with one of the transparent internal lenses via the reflective surface;
    wherein the lens element comprises a first locating structure formed on the sidewall, the optical connector comprises a jumper having a second locating structure, and the jumper is positioning in the positioning space by engagement between the first locating structure and the second locating structure.

11. The optical connector of claim 10, wherein the first locating structure comprises two positioning pins extending up from the sidewall, the second locating structure defines two locating holes, and the two positioning pins insert into the two locating holes to secure the jumper in the positioning space.

12. The optical connector of claim 10, wherein the jumper is substantially rectangular and comprises a first surface, a second surface perpendicularly connected with the first surface, and a third surface perpendicularly connected with the first surface and opposite to the second surface, and the second locating structure is formed in the second surface.

13. The optical connector of claim 12, wherein the jumper defines a fixing space in an intersecting portion of the first surface and the second surface, the fixing space is substantially rectangular and has a side surface that is substantially parallel with the second surface, the jumper defines a plurality of through holes in the side surface and extending through the third surface, the through holes are equidistantly arranged along a line that is substantially parallel with the first surface, and each through hole is aligned with one of the external lenses.

* * * * *